(12) United States Patent
Harrup et al.

(10) Patent No.: US 8,124,414 B2
(45) Date of Patent: Feb. 28, 2012

(54) TAGGANTS, METHOD FOR FORMING A TAGGANT, AND A METHOD FOR DETECTING AN OBJECT

(75) Inventors: Mason K. Harrup, Idaho Falls, ID (US); Frederick F. Stewart, Idaho Falls, ID (US); Mark L. Stone, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 189 days.

(21) Appl. No.: 12/613,343

(22) Filed: Nov. 5, 2009

(65) Prior Publication Data

US 2011/0100091 A1 May 5, 2011

(51) Int. Cl.
*G01N 30/02* (2006.01)
*G01N 31/00* (2006.01)
*G01N 30/00* (2006.01)

(52) U.S. Cl. .......... 436/56; 73/23.35; 73/23.2; 250/282; 250/281; 250/459.1; 250/458.1

(58) Field of Classification Search .................... 436/56; 73/23.35, 23.2; 252/408.1; 250/282, 281, 250/459.1, 458.1; 356/51
See application file for complete search history.

(56) References Cited

U.S. PATENT DOCUMENTS 3,935,339 A 1/1976 Cooke, Jr.

(Continued)

OTHER PUBLICATIONS

Sigman et al., "Perfluoro(methylcyclohexane) tracer tagging test and demonstration," CRADA Final Report for CRADA No. ORNL99-0562, Oak Ridge National Laboratory, Jul. 26, 2000, pp. 1-32.

(Continued)

*Primary Examiner* — Christine T Mui
(74) *Attorney, Agent, or Firm* — TraskBritt

(57) ABSTRACT

A taggant comprising at least one perfluorocarbon compound surrounded by a polyphosphazene compound. The polyphosphazene compound has the chemical structure:

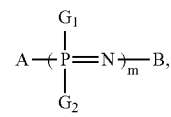

wherein $G_1$ and $G_2$ are pendant groups having different polarities, m is an integer greater than or equal to 100, and each of A and B is independently selected from hydrogen, an alkyl, an alkene, an alkoxide, a polyether, a polythioether, a siloxane, and $-X(CH_2)_n Y^1(CH_2)p_1 Y^2(CH_2)p_2 \ldots Y^i(CH_2) p_i CH_3$, where n ranges from 1 to 6, X and Y are independently selected from oxygen, sulfur, selenium, tellurium, and polonium, and $p_1$ through $p_i$ range from 1 to 6. Cyclic polyphosphazene compounds lacking the A and B groups are also disclosed, as are methods of forming the taggant and of detecting an object.

29 Claims, 4 Drawing Sheets

U.S. PATENT DOCUMENTS

| | | | |
|---|---|---|---|
| 5,362,568 | A | 11/1994 | Dietz et al. |
| 5,409,839 | A | 4/1995 | Balestrieri et al. |
| 5,562,099 | A | 10/1996 | Cohen et al. |
| 5,974,150 | A | 10/1999 | Kaish et al. |
| 6,025,200 | A | 2/2000 | Kaish et al. |
| 6,146,787 | A | 11/2000 | Harrup et al. |
| 6,214,624 | B1 | 4/2001 | Barker et al. |
| 6,392,008 | B1 * | 5/2002 | Allcock et al. ............... 528/399 |
| 6,403,755 | B1 | 6/2002 | Stewart et al. |
| 6,544,690 | B1 | 4/2003 | Harrup et al. |
| 6,596,204 | B1 | 7/2003 | Landers |
| 7,008,564 | B2 | 3/2006 | Harrup et al. |
| 7,074,256 | B2 | 7/2006 | Stewart et al. |
| 7,089,420 | B1 | 8/2006 | Durst et al. |
| 7,162,035 | B1 | 1/2007 | Durst et al. |
| 7,285,362 | B2 | 10/2007 | Harrup et al. |
| 7,773,749 | B1 | 8/2010 | Durst et al. |
| 7,995,196 | B1 | 8/2011 | Fraser |
| 2004/0033406 | A1 * | 2/2004 | Andrianov et al. ............ 429/33 |
| 2006/0016331 | A1 * | 1/2006 | Stewart et al. ................... 95/49 |

OTHER PUBLICATIONS

Stewart et al., "Synthesis, characterization and thermal stability of phosphazene terpolymers with 2-(2-methoxyethoxy)ethoxy and diacetone D-glucofuranosyl pendant groups," Polym Int 49:57-62 (2000).

"Demonstration of the Use of an Encapsulated Perfluorocarbon Vapor Taggant to Track and Detect Currency or Contraband," Tracer Detection Technology Corp., Syosset, N.Y., 2000, pp. 1-15.

Definition of "Fluorocarbon," Wikipedia <<http://en.wikipedia.org/wiki/Perfluorocarbon>> Sep. 22, 2011, 2 pages.

Definition of "Perfluorocarbon," The Free Dictionary by Farlex, <<http://medical-dictionary.thefreedictionary.com/perfluorocarbon>> (2011) 1 page.

* cited by examiner

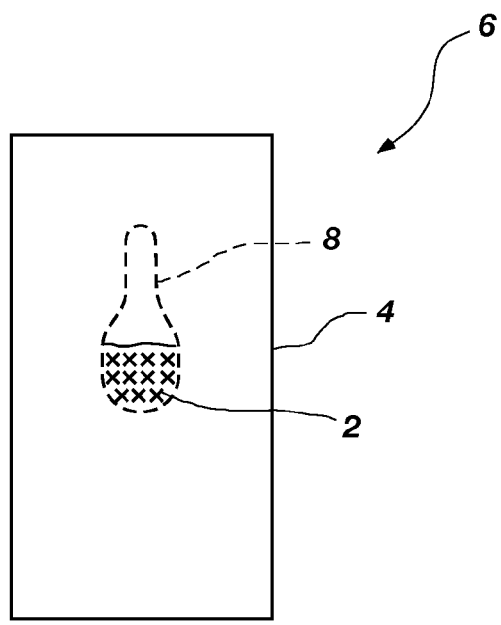
FIG. 1
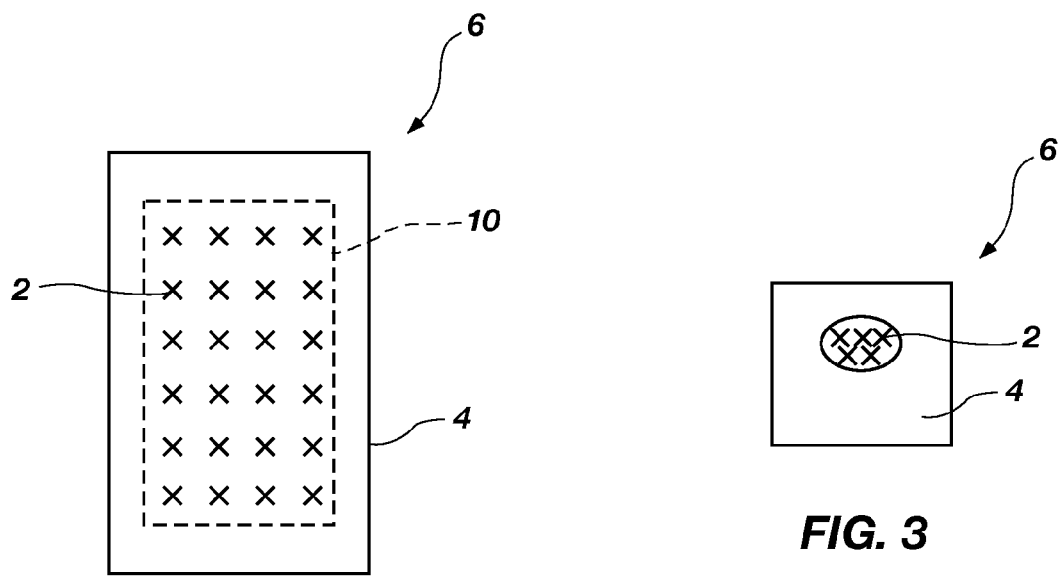
FIG. 2
FIG. 3

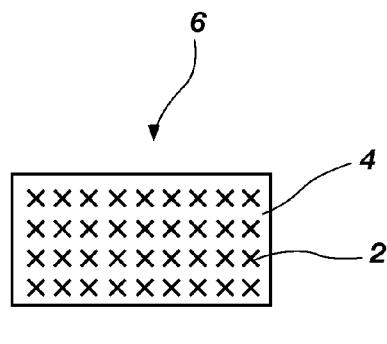
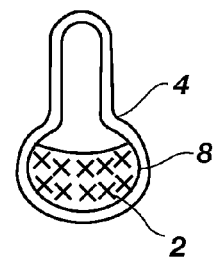
FIG. 4
FIG. 5
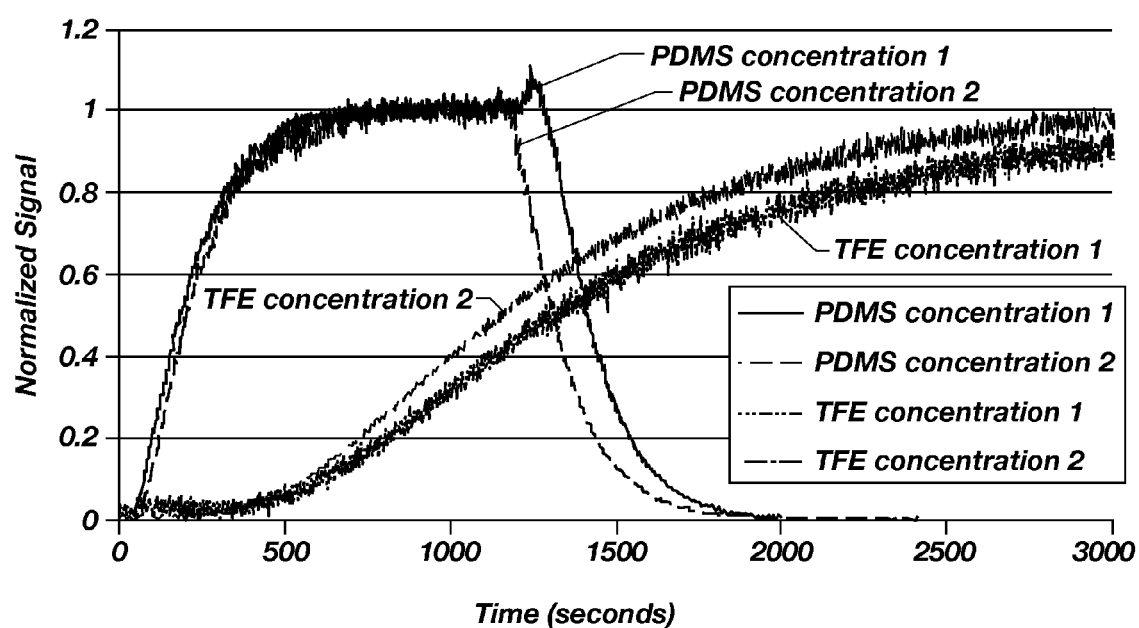
FIG. 6

TAGGANTS, METHOD FOR FORMING A TAGGANT, AND A METHOD FOR DETECTING AN OBJECT

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

CROSS-REFERENCE TO RELATED APPLICATION

This application is related to U.S. patent application Ser. No. 13/208,969, filed Aug. 12, 2011, pending.

TECHNICAL FIELD

Embodiments of the invention relate to a taggant including a perfluorocarbon compound incorporated into a polyphosphazene compound, a method of forming the taggant, and a method of detecting an object using the taggant.

BACKGROUND

Perfluorocarbon Tracers (PFTs) are small perfluoroalkyl molecules that have been used as tracers to track or definitively mark a variety of objects, such as currency, drugs, crops, chemical compounds, vehicles, goods in commerce, letters, parcels, briefcases, paper documents, or people. PFTs are safe, volatile, non-reactive, environmentally benign compounds that are virtually non-existent (less than parts per quadrillion) in nature. Therefore, PFTs are detectable in the environment at extremely low levels, on the order of parts per trillion or less. The ambient background concentrations of the five routinely used PFTs are in the range of parts per 10E+15 of air. As such, PFTs may be easily and accurately detected and are finding use as specific tracker/taggant molecules in a variety of law enforcement and homeland security operations or missions. In order to function effectively as a taggant, the PFT must be of sufficient concentration in air as to enable unambiguous identification or detection, and also must be sufficiently long-lasting as to fulfill various mission parameters. The PFT is typically incorporated into a matrix, such as wax, a polymer, such as a urea-formaldehyde polymer, a liposome, a polysaccharide, a plastic, such as a polyvinylidene fluoride, or a large molecule inclusion complex, such as cyclodextrin. One barrier to improving the use and effectiveness of this PFT technology is the ability to release the PFT in a time-dependent manner. Since the release profile of the PFT from the matrix is typically a function of the PFT, the release profile of the PFT is static and cannot be adjusted or tuned to meet the requirements of different operations. As a consequence, there is insufficient control of the release profile for many potential operations, such as release of the PFT over a long duration of time. Therefore, the effectiveness and widespread adoption of this technology to date has been severely limited.

It would be desirable to be able to control or adjust the release of the PFT to provide flexibility for different operations. The ability to provide an optimized release profile for a wide variety of missions will enable the PFTs to be utilized in a broad array of operations, both for domestic security as well as information gathering abroad. To accomplish this, a versatile material is needed that may be easily and reliably tailored, enabling the release rate of the PFT to be tailorable over a range of conditions.

SUMMARY OF THE INVENTION

In one embodiment, the present invention comprises a taggant comprising at least one perfluorocarbon compound and a polyphosphazene compound. The at least one perfluorocarbon compound is surrounded by the polyphosphazene compound.

In another embodiment, the present invention comprises a taggant comprising at least one perfluorocarbon compound encased in a polyphosphazene compound. The polyphosphazene compound comprises the following chemical structure:

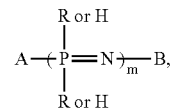

wherein R and H are independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido such that R is more polar than H, m is an integer greater than or equal to 100, and each of A and B is independently selected from hydrogen, an alkyl, an alkene, an alkoxide, a polyether, a polythioether, a siloxane, and $-X(CH_2)_n Y^1(CH_2)_{p_1} Y^2(CH_2)_{p_2} \ldots Y^i(CH_2)p_i CH_3$, where n ranges from 1 to 6, X and Y are independently selected from oxygen, sulfur, selenium, tellurium, and polonium, and $p_1$ through $p_i$ range from 1 to 6.

In another embodiment, the present invention comprises a taggant comprising at least one perfluorocarbon compound surrounded by a polyphosphazene compound, the polyphosphazene compound comprising the following chemical structure:

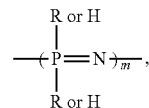

wherein R and H are independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, aryloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido such that R is more polar than H and m is an integer greater than or equal to 100.

In another embodiment, the present invention comprises a taggant including at least one perfluorocarbon compound incorporated into a heteropolymeric polyphosphazene compound. The heteropolymeric polyphosphazene compound comprises a plurality of phosphorous-nitrogen units having a double bond between each phosphorus atom and each nitrogen atom of the phosphorous-nitrogen units, each of the plurality of phosphorous-nitrogen units bonded to an adjacent phosphorous-nitrogen unit by a single bond, wherein at least two pendant groups are bonded to each phosphorus atom of each phosphorous-nitrogen unit. The at least two pendant groups have different polarities.

In another embodiment, the present invention comprises a method of forming a taggant. The method comprises producing a polyphosphazene compound comprising the following chemical structure:

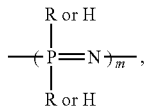

wherein R and H are independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido such that R is more polar than H, m is an integer greater than or equal to 100, and each of A and B is independently selected from hydrogen, an alkyl, an alkene, an alkoxide, a polyether, a polythioether, a siloxane, and —X(CH$_2$)$_n$Y$^1$(CH$_2$)p$_1$Y$^2$(CH$_2$)p$_2$...Y$^i$(CH$_2$) p$_i$CH$_3$, where n ranges from 1 to 6, X and Y are independently selected from oxygen, sulfur, selenium, tellurium, and polonium, and p$_1$ through p$_i$ range from 1 to 6. A perfluorocarbon compound is surrounded with the polyphosphazene compound.

In another embodiment, the present invention comprises a method of detecting an object. The method comprises applying a taggant to an object. The taggant comprises at least one perfluorocarbon compound contained within a polyphosphazene compound. The taggant is detected by release of the at least one perfluorocarbon compound through the polyphosphazene compound.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings, in which:

FIGS. 1-5 are schematic illustrations of taggants according to multiple embodiments of the invention;

FIG. 6 is a graph illustrating the permeability of perfluoro (1,3-dimethylcyclo-hexane) through polydimethylsiloxane and poly(bis trifluoroethoxy)phosphazene;

DETAILED DESCRIPTION

Figure 7:
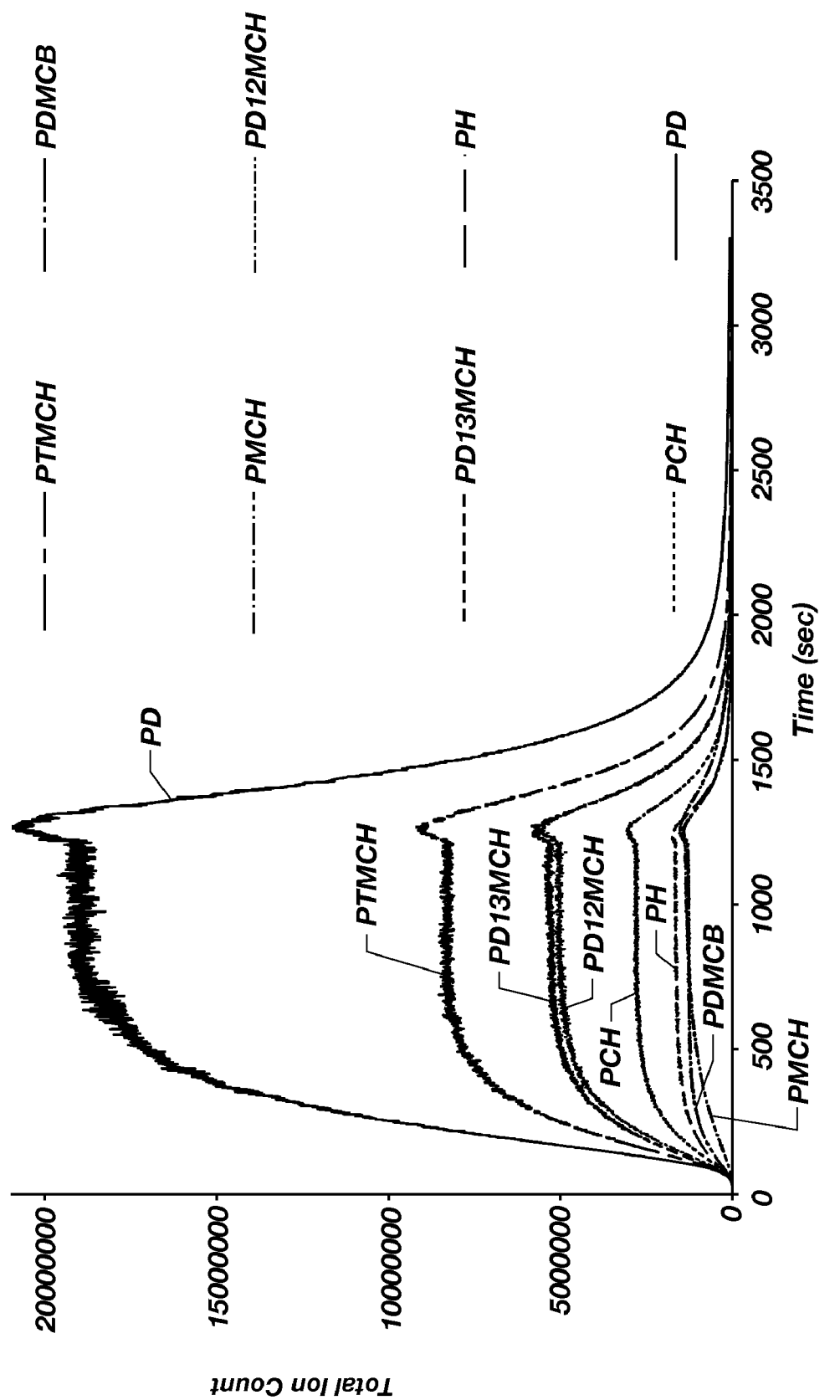
FIG. 7 is a graph illustrating the permeability of various perfluorocarbon compounds through polydimethylsiloxane.

A taggant including at least one polyphosphazene compound and at least one perfluorocarbon compound is disclosed. The perfluorocarbon compound may be enclosed within, dispersed into, or otherwise incorporated into the polyphosphazene compound. As described in detail below, in one embodiment, the taggant includes the perfluorocarbon compound distributed throughout the polyphosphazene compound, forming a homogeneous material. In another embodiment, the taggant is a heterogeneous material and includes the perfluorocarbon compound contained within or encapsulated by the polyphosphazene compound. By way of non-limiting example, the perfluorocarbon compound may be contained within a pouch or reservoir formed from the polyphosphazene compound. The polyphosphazene compound may function as a diffusion barrier through which or from which the perfluorocarbon compound permeates. By appropriately selecting the polyphosphazene compound and the perfluorocarbon compound, timing of the release of the perfluorocarbon compound through or from the polyphosphazene compound is tunable or tailorable. As such, the taggant having a desired time-related release profile may be produced.

When released through or from the polyphosphazene compound, the perfluorocarbon compound may be readily detected in the surrounding environment, such as in air. Depending on the vapor pressure or volatility of the perfluorocarbon compound, the perfluorocarbon compound may be detectable in the surrounding environment as quickly as from seconds to minutes. However, if the perfluorocarbon compound has a low vapor pressure, the perfluorocarbon compound may only be detectable hours or months after release. Once released, the perfluorocarbon compound may be detectable for a variable amount of time, such as from hours to months, depending on the material used as the perfluorocarbon compound. Since the release profile of the taggant may be tailored for a desired operation, the resulting taggants are useful in a variety of situations ranging from those of short duration to those of long duration, improving the versatility of the taggant. By using the polyphosphazene compound as a tunable diffusion barrier, the utility of the perfluorocarbon compound as a clandestine tracer molecule is improved for a wide variety of operations. In addition, since the perfluorocarbon compound is inert and non-toxic, the taggant is environmentally benign and substantially non-reactive.

The polyphosphazene compound may provide sufficient mechanical or physical strength to the taggant for its intended use. In one embodiment, the polyphosphazene compound is formulated so as to be capable of forming a thin film or thin membrane at the temperature at which the taggant is to be used. The temperature at which the taggant is to be used may be within a range of from approximately −10° C. to approximately 100° C., such as from approximately 0° C. to approximately 30° C. The film or membrane may have a thickness of from approximately 40 μm to approximately 100 μm. As shown in FIGS. 1 and 2, the film of the polyphosphazene compound 4 may be used to envelop or encase the perfluorocarbon compound 2, forming the pouch in which the perfluorocarbon compound 2 is contained. As explained in more detail below, the perfluorocarbon compound 2 may, optionally, be contained in a container formed from an impermeable material 8 or in an absorbent material 10. In another embodiment, the polyphosphazene compound 4 is a wax-like material at a temperature at which the taggant 6 is to be used, such as within the above-mentioned temperature range. The taggant 6 may also include the polyphosphazene compound 4 surrounding or encasing the perfluorocarbon compound 2, as shown in FIG. 3. As shown in FIG. 4, the perfluorocarbon compound 2 may be dispersed throughout the polyphosphazene compound 4, producing a taggant 6 that is homogeneous.

The polyphosphazene compound 4 is a compound having a plurality of phosphorous-nitrogen units with two pendant groups (G) attached to each phosphorus atom of the phosphorous-nitrogen units. Each phosphorous-nitrogen unit includes a double bond between the phosphorus atom and the nitrogen atom. Each phosphorous-nitrogen unit is bonded to an adjacent phosphorous-nitrogen unit through a single bond. The polyphosphazene compound 4 may be linear or cyclic. If the polyphosphazene compound 4 is linear, the polyphosphazene compound 4 may have the chemical structure shown below:

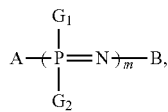

where the G groups are pendant groups, m is an integer greater than or equal to 100, and each of A and B is independently selected from hydrogen, an alkyl, an alkene, an alkoxide, a polyether, a polythioether, a siloxane, and —X(CH$_2$)$_n$Y$^1$(CH$_2$)p$_1$Y$^2$(CH$_2$)p$_2$ . . . Y$^i$(CH$_2$)p$_i$CH$_3$, where n ranges from 1 to 6, X and Y are independently selected from oxygen, sulfur, selenium, tellurium, and polonium, and p$_1$ through p$_i$ range from 1 to 6. By way of non-limiting example, m may be an integer of from greater than or equal to 500 to less than or equal to 5000. When m is within the above-mentioned range, the polyphosphazene compound 4 may be a soft wax-like material or may have sufficient rigidity or stiffness to form a film or sheet. In one embodiment, m is between greater than or equal to 2000 and less than or equal to 4000. Each of the G groups may be independently selected from a release group (R) or a hold group (H). If the polyphosphazene compound 4 is cyclic, the polyphosphazene compound 4 may have the chemical structure shown below:

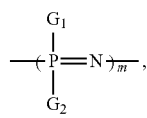

where the G groups and m are defined as previously described.

While the chemical structures above depict the polyphosphazene compound 4 as a homopolymer, the polyphosphazene compound 4 may be a heteropolymer. As used herein, the term "homopolymer" means and includes a compound having the same R and H groups bonded to each phosphorus atom of each phosphorous-nitrogen unit, the same R groups bonded to each phosphorus atom of each phosphorous-nitrogen unit, or the same H groups bonded to each phosphorus atom of each phosphorous-nitrogen unit. By way of non-limiting example, the homopolymer may have one of the general chemical structures shown below:

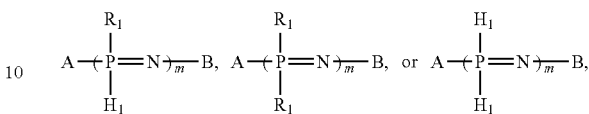

where the R groups and H groups are as described below, A and B are as described above, and m is as described above. If the polyphosphazene compound 4 is cyclic, the polyphosphazene compound 4 may have a chemical structure similar to one of the chemical structures shown above, except that A and B are lacking.

The term "heteropolymer" means and includes a compound having different R groups and H groups bonded to the phosphorus atom of each phosphorous-nitrogen unit. By way of non-limiting example, the polyphosphazene compound 4 may have the general chemical structure shown below:

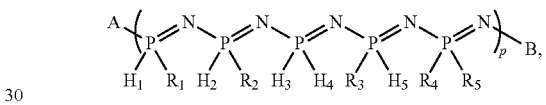

where the R groups and H groups are as described below, p is an integer greater than or equal to 20, and each of A and B is as described above. If the polyphosphazene compound 4 is cyclic, the polyphosphazene compound 4 may have a chemical structure similar to the chemical structure above, except that A and B are lacking Polyphosphazene compounds 4 having different combinations of R groups and H groups bonded to each phosphorus atom of each phosphorous-nitrogen unit are also contemplated. In addition, the polyphosphazene compound 4 is not limited to a compound having "p" repeats of five phosphorous-nitrogen units, as depicted above. Rather, the polyphosphazene compound 4 may include "p" repeats of more or fewer phosphorous-nitrogen units. Alternatively, the polyphosphazene compound 4 may include a plurality of phosphorus-nitrogen units where the phosphorus atoms of the phosphorous-nitrogen units have the R groups and/or H groups bonded thereto, as described above, except that there is no pattern or order to the combinations of R groups and/or H groups bonded to the phosphorous atoms. Such a polyphosphazene compound 4 may include greater than or equal to 100 phosphorous-nitrogen units, such as from greater than or equal to 500 to less than or equal to 5000 phosphorous-nitrogen units. In one embodiment, the polyphosphazene compound 4 includes between greater than or equal to 2000 and less than or equal to 4000 phosphorous-nitrogen units.

The R groups and the H groups may provide different physical or chemical properties or affinities to the polyphosphazene compound 4, which affects the solubility of the perfluorocarbon compound 2 in the polyphosphazene compound 4. The R groups may be viewed as so-called "release groups" and may be selected to provide insolubility of the perfluorocarbon compound 2 in the polyphosphazene compound 4. The R groups may be rigid, polar moieties that minimize non-bonded interactions between the polyphosphazene compound 4 and the perfluorocarbon compound 2. Since the R groups of the perfluorocarbon compound 2 are insoluble in the polyphosphazene compound 4, the perfluorocarbon compound 2 may become destabilized and released from the polyphosphazene compound 4. As a result, the presence of R groups in the polyphosphazene compound 4 may contribute to a relatively fast release rate of the perfluorocarbon compound 2 from the polyphosphazene compound 4. The release rate may be expressed in units of permeability (the barrer) of the perfluorocarbon compound 2 through the polyphosphazene compound 4. By way of non-limiting example, a so-called "fast" release rate of the polyphosphazene compound 4 may range from greater than about 400 barrers to about 2400 barrers. The R groups may also provide desirable physical properties to the polyphosphazene compound 4, such as providing a waxy or filmy consistency. In one embodiment, the R group is a methylphenoxy moiety.

The H groups may be viewed as so-called "hold groups" and may be selected to provide solubility of the perfluorocarbon compound 2 in the polyphosphazene compound 4. The H groups may be non-polar moieties. While the R group is described as being polar and the H group is described as being non-polar, the terms "polar" and "non-polar" are used herein to indicate relative, not absolute, polarities of the groups. Stated another way, the R groups, when present, are more polar than the H groups, when present. By appropriately selecting the H groups, non-bonded interactions between the perfluorocarbon compound 2 and the polyphosphazene compound 4 may be maximized. Accordingly, the solubility of the perfluorocarbon compound 2 in the polyphosphazene compound 4 may be maintained, providing a slow release of the perfluorocarbon compound 2 from the polyphosphazene compound 4. By way of non-limiting example, a so-called "slow" release rate of the polyphosphazene compound 4 may range from about 0 barrers to about 100 barrers. In one embodiment, the H group is a short chain perfluoroalkyl moiety, such as a perfluoroalkyl moiety having between 1 carbon atom and 6 carbon atoms. The specific choice for the perfluoroalkyl moiety may be selected based on the desired interactions of the polyphosphazene compound 4 with the perfluorocarbon compound 2. The solubility of the perfluorocarbon compound 2 may also be affected by the chain length and, thus, the molecular weight of the perfluoroalkyl moiety. However, if the perfluoroalkyl moiety includes greater than 6 carbon atoms, the effect of the phosphorous-nitrogen portion of the polyphosphazene compound 4 on the physical properties and chemical properties of the polyphosphazene compound 4 may be reduced. By adjusting the chain length and molecular weight, the physical properties and chemical properties (chemical affinity) of the polyphosphazene compound 4 may be tailored as desired.

By appropriately selecting the pendant groups on the polyphosphazene compound 4, the release rate of the perfluorocarbon compound 2 from the taggant 6 may be tailored to be fast, slow, or intermediate. By way of non-limiting example, to produce a polyphosphazene compound 4 having a fast release rate, the pendant groups may be substantially all R groups. The moieties used as the R groups for such a polyphosphazene compound 4 may be the same or different. Conversely, to produce a polyphosphazene compound 4 having a slow release rate, the pendant groups may be substantially all H groups. The moieties selected as the H groups for such a polyphosphazene compound 4 may be the same or different. To achieve a polyphosphazene compound 4 with an intermediate release rate, the pendant groups may include a combination of R groups and H groups. By way of non-limiting example, a so-called "intermediate" release rate of the polyphosphazene compound 4 may range from greater than about 100 barrers to less than about 400 barrers. By way of non-limiting example, the polyphosphazene compound 4 may include substantially equal numbers of R groups and H groups, with the moieties selected for each of the R groups and the H groups being the same or different.

The R groups and H groups of the polyphosphazene compound 4 may be independently selected from the following moieties such that the R groups (when present) are more polar than the H groups (when present): alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido. As known in the art, the polarity of a moiety is determined by its dipole moment, which depends on the atoms present in the moiety. Determining the polarity of a moiety is known in the art and, therefore, is not described in detail herein. As evidenced by the diversity of the above-mentioned R groups and H groups, these groups may be bonded to the phosphorus atom of the phosphorus-nitrogen unit through a carbon atom, an oxygen atom, a nitrogen atom, or a sulfur atom. Examples of specific pendant groups that may be used include, but are not limited to, trifluoromethyl phenoxy, phenoxy, ethylformylphenoxy, methylphenoxy, trifluoroethoxy, 2,4-di-tert-butyl phenoxy, diethylene glycol, oxyphenyl$CO_2H$, -oxyphenyl$SO_3H$, oxyphenylhydroxyl, a monosaccharide, or a disaccharide.

The term "alkyl" means and includes a saturated, straight, branched, or cyclic hydrocarbon containing from 1 carbon atom to 6 carbon atoms. Examples include, but are not limited to, methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl.

The terms "alkenyl" and "alkynyl" mean and include a straight, branched, or cyclic hydrocarbon containing from 2 carbon atoms to 6 carbon atoms with at least one double or at least one triple bond, respectively.

The term "alkoxy" means and includes an alkyl group linked to an oxygen atom.

The terms "alkylamino" or "dialkylamino" mean and include an amino group having one or two alkyl substituents, respectively.

The term "alkylarylamino" means and includes an alkyl group with an aryl and an amino substituent.

The term "alkylthio" means and includes an alkyl group with a thio substituent.

The term "alkarylthio" means and includes an alkyl group and an aryl group linked to a sulfur atom.

The term "aryl" means and includes a phenyl or substituted phenyl group, wherein the substituent is a halo, alkyl, alkoxy, alkylthio, amide, amino, alkylamino, dialkylamino, haloalkyl, hydroxyalkyl, alkoxyalkyl, methylenedioxy, cyano, C(O)(lower alkyl), —$CO_2H$, —$SO_3H$, or —$CO_2$, and wherein the aryl group can have up to four substituents.

The terms "arylamino" and "diarylamino" mean and include an amino group having one or two aryl substituents, respectively.

The term "aryloxy" means and includes an aryl group linked to an oxygen atom.

The term "aralkyl" means and includes an aryl group with an alkyl substituent.

The term "alkaryl" means and includes an alkyl group with an aryl substituent. Examples include, but are not limited to, benzyl, substituted benzyl, phenethyl, or substituted phenethyl, wherein the substituents are as defined above for aryl groups.

The term "alkaryloxy" means and includes an alkyl group and an aryl group linked to an oxygen atom.

The term "aralkoxy" means and includes an aryl group and an alkyl group linked to an oxygen atom.

The term "arylthio acyl" means and includes an aryl group with a thio and an acyl substituent.

The term "acylamino" means and includes an acyl group with an amino substituent.

The term "acyloxy" means and includes an acyl group bonded to an oxygen atom.

The term "glycol" means and includes a hydrocarbon containing two hydroxyl groups.

The term "halogen" means and includes fluoro, chloro, bromo, or iodo.

The term "heteroalkyl" means and includes an alkyl group that includes a heteroatom such as oxygen, sulfur, or nitrogen (with valence completed by hydrogen or oxygen) in the carbon chain or terminating the carbon chain.

The term "heteroaralkyl" means and includes an aromatic moiety that includes at least one sulfur, oxygen, or nitrogen in the aromatic ring.

The term "heteroaryl" means and includes an aromatic moiety that includes at least one sulfur, oxygen, or nitrogen in the aromatic ring, and that can be optionally substituted as described above for aryl groups. Examples include, but are not limited to, furyl, pyridyl, pyrimidyl, thienyl, isothiazolyl, imidazolyl, tetrazolyl, pyrazinyl, benzofuranyl, benzothiophenyl, quinolyl, isoquinolyl, benzothienyl, isobenzofuryl, pyrazolyl, indolyl, isoindolyl, benzimidazolyl, purinyl, carbozolyl, oxazolyl, thiazolyl, isothiazolyl, 1,2,4-thiadiazolyl, isooxazolyl, pyrrolyl, pyrazolyl, quinazolinyl, pyridazinyl, pyrazinyl, cinnolinyl, phthalazinyl, quinoxalinyl, xanthinyl, hypoxanthinyl, pteridinyl, 5-azacytidinyl, 5-azauracilyl, triazolopyridinyl, imidazolopyridinyl, pyrrolopyrimidinyl, and pyrazolopyrimidinyl.

The term "oxy(aliphatic)" means and includes an oxygen atom linked to an aliphatic group. The term "aliphatic" means and includes a non-aromatic compound formed of hydrogen and carbon and collectively refers to an alkyl, alkenyl, or alkynyl group.

The term "oxy(aliphatic)hydroxyl" means and includes an oxygen atom linked to an aliphatic group and a hydroxyl group.

The term "oxy(alkyl)hydroxyl" means and includes an oxygen atom linked to an alkyl group and a hydroxyl group.

The term "oxycarbonyl" means and includes an oxygen atom linked to a carbonyl group.

The term "oxysulfonyl" means and includes an oxygen atom linked to a sulfonyl group.

The term "perfluoroalkyl" means and includes an alkyl group in which each of the hydrogen atoms is substituted with fluorine.

The saccharide is a monosaccharide or a disaccharide. The term "monosaccharide" means and includes a sugar, such as glucose, fructose, galactose, xylose, ribose, arabinose, lyxose, ribulose, xylulose, or mannose. The term "disaccharide" means and includes a sugar containing two monosaccharides. The disaccharide may, for example, be sucrose, lactose, or maltose.

The term "sulfonamido" means and includes a sulfonyl group bonded to an amido group.

The term "sulfonylamino" means and includes a sulfonyl group bonded to an amino group.

The term "sulfoxide" means and includes a compound in which a sulfur and oxygen atom are bonded to one another and two carbon atoms are bonded to the carbon atom.

The term "thioaralkyl" means and includes an aryl group and an alkyl group linked to a sulfur atom.

The term "trifluoroalkyl" means and includes an alkyl group with a trifluoro substituent.

Any of the above-mentioned moieties may be further substituted with at least one substituent, such as with a halogen, sulfonyl, or phosphate moiety.

In addition to the polyphosphazene compound 4, the taggant 6 may also include another polymer in the diffusion barrier. The diffusion barrier may include a combination of the polyphosphazene compound 4 and the polymer. The polymer may be a fluoroelastomer, a polysilicone, a polyaromatic, a polysulfone, a polyaliphatic, or a thermoplastic. By way of non-limiting example, the polymer may be a copolymer of vinylidenefluoridehexafluoro-propylene, such as VITON®, a polydimethylsiloxane (PDMS), a polystyrene, such as that sold under the TRYCITE® tradename (Dow Chemical Co. (Midland, Mich.)), a polysulfone, such as UDEL® P-3500 (Solvay Advanced Polymers, LLC (Alpharetta, Ga.)), or a vinyl rubber. The another polymer may be combined with the polyphosphazene compound 4 and used in the diffusion barrier.

By way of non-limiting example, the polyphosphazene compound 4 may be one of the following compounds:

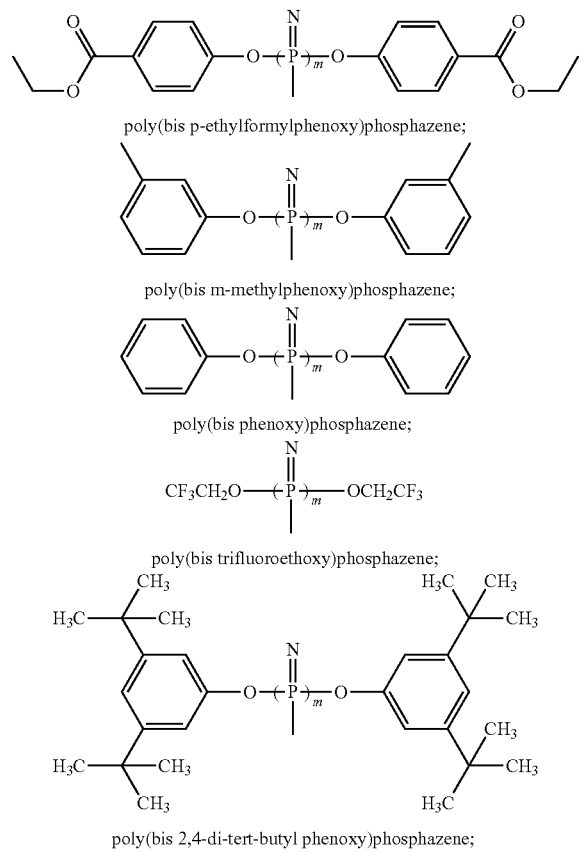

-continued

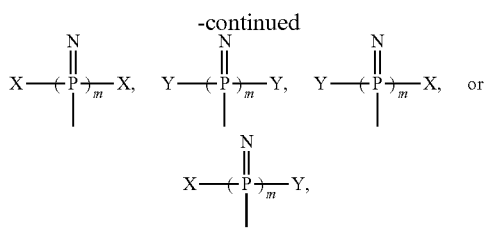

where X=a sugar derivative, Y=diethylene glycol, and m is as previously defined, which are collectively referred to herein as a poly(DEG sugar)phosphazene; or

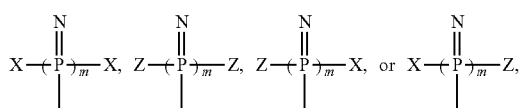

where X=a sugar derivative, Z=trifluoroethoxy, and m is as previously defined, which are collectively referred to herein as a poly(40% sugar derivative—60% trifluoroethoxy)phosphazene. The sugar derivative in the compounds mentioned above may include, but is not limited to, a derivative of glucose, fructose, galactose, xylose, ribose, arabinose, lyxose, ribulose, xylulose, mannose, sucrose, lactose, or maltose. The sugar derivative may be one of the above-mentioned sugars having a single hydroxyl group available for bonding to the phosphorus atom of the polyphosphazene compound, which prevents uncontrolled cross-linking The remaining hydroxyl groups may be protected by at least one protecting group. For instance, the remaining hydroxyl groups may be converted to ether groups, reducing their reactivity with the phosphorus atom of the polyphosphazene compound. Suitable protecting groups for hydroxyl groups of sugars are known in the art and, therefore, are not described in detail herein. The sugar derivative may bond to the phosphorus atom of the polyphosphazene compound by way of the unprotected hydroxyl group. By way of non-limiting example, X may be a diacetone protected D-glucofuranose.

The polyphosphazene compound 4 may also be a polyphosphazene compound as described in U.S. Pat. Nos. 6,146, 787, 6,403,755, 6,544,690, 7,008,564, 7,074,256, and 7,285, 362, the disclosure of each of which patents is incorporated herein in its entirety by this reference.

Since the functions of the R groups and H groups of the polyphosphazene compound 4 are directly competitive with one other, with the R groups tending to increase the release rate of the perfluorocarbon compound 2 and the H groups tending to decrease the release rate, the overall release rate of the perfluorocarbon compound 2 from the taggant 6 may be determined by the balance, or average, of the properties provided by the R groups and the H groups. By changing the identity of the R groups and the H groups or the relative amounts of R groups and H groups, the holding capacity and release profile of the perfluorocarbon compound 2 from the polyphosphazene compound 4 may be tailored as desired. Stated another way, a taggant 6 having a slow release rate and high holding capacity, a fast release rate and low holding capacity, or an intermediate release rate and an intermediate holding capacity may be produced in a single taggant 6 formulation.

A polyphosphazene compound 4 in which substantially all of the pendant groups are H groups may provide a high holding capacity for the perfluorocarbon compound 2 and a slow rate of release. This release profile may be desirable when the ability to detect the perfluorocarbon compound 2 is to be maintained for a long period of time, such as on the order of from weeks to months or years. Conversely, a polyphosphazene compound 4 in which substantially all of the pendant groups are R groups may not bind the perfluorocarbon compound 2 very well. As such, the release rate of such a perfluorocarbon compound 2 from the polyphosphazene compound 4 may be fast, with the release rate mainly limited by the natural vapor pressure of the perfluorocarbon compound 2. This release profile may be desirable when the perfluorocarbon compound 2 needs to be detectable for a short period of time, such as on the order of from minutes to hours. Similarly, a polyphosphazene compound 4 in which a combination of R groups and H groups are present or the relative numbers of R groups and H groups are substantially equal may have an intermediate release rate and intermediate holding capacity.

The desired ratio of R groups and H groups on the polyphosphazene compound 4 may be achieved by controlling the synthesis of the polyphosphazene compound 4. The polyphosphazene compound 4 may be synthesized by macromolecular substitution, providing the ability to incorporate more than one pendant group into a single polyphosphazene compound 4. By adjusting the synthesis conditions, such as the relative amounts of starting materials or the temperature or pressure conditions, a polyphosphazene compound 4 having the desired ratio of pendant groups may be produced. One example of synthesizing a polyphosphazene compound 4 is described in Stewart et al., "Synthesis, Characterization and Thermal Stability of Phosphazene Terpolymers with 2-(2-Methoxyethoxy)ethoxy and Diacetone D-Glucofuranosyl Pendant Groups," Polymer International, 2000, 49(1):57-62, the disclosure of which is incorporated herein in its entirety by this reference. By producing the polyphosphazene compound 4 having the desired R and H groups, the release rate and holding capacity of the perfluorocarbon compound 2 may be controlled. In addition, the release rate and holding capacity of the perfluorocarbon compound 2 may be reproducible from batch to batch of the taggant 6.

The polyphosphazene compound 4 may be synthesized by conventional techniques, such as by a nucleophilic substitution reaction of at least one organic nucleophile with poly[bis-chlorophosphazene]. The poly[bis-chlorophosphazene] may be synthesized by a ring-opening polymerization of hexachlorocyclotriphosphazene (also known as phosphonitrilic chloride trimer), which is commercially available, such as from Sigma-Aldrich Co. (St. Louis, Mo.). The ring-opening polymerization, which produces a linear polymer from the hexachlorocyclotriphosphazene is conducted by conventional techniques and, therefore, is not described in detail herein. The desired pendant groups for the polyphosphazene compound 4 may be bonded to the phosphorus atom of the poly[bis-chlorophosphazene] by a nucleophilic substitution reaction between the poly[bis-chlorophosphazene] and at least one organic nucleophile containing the desired pendant groups. If the desired polyphosphazene compound 4 is a homopolymer, a single organic nucleophile having the desired pendant group may be reacted with the phosphorus atom of the poly[bis-chlorophosphazene].

If the desired polyphosphazene compound 4 is a heteropolymer, two or more organic nucleophiles may be reacted with the phosphorus atom of the poly[bis-chlorophosphazene], with each of the organic nucleophiles including one of the desired pendant groups to be present on the polyphosphazene compound 4. A desired amount of a first organic nucleophile that includes a first pendant group may be reacted with the phosphorus atom of the poly[bis-chlorophosphazene] and heated to ensure all of the first organic nucleophile reacts. An excess of the second organic nucleophile that includes a second pendant group may then be added to the reaction mixture of the poly[bis-chlorophosphazene] and the first organic nucleophile and heated until all the chlorine atoms of the poly[bis-chlorophosphazene] have been replaced with the first or second pendant groups. The first organic nucleophile may be a source of the pendant group having the greater steric bulk. After removing impurities, such as any excess second organic nucleophile and sodium chloride, by repeated dissolution/precipitation, the heteropolymeric polyphosphazene compound 4 may be obtained. While synthesizing a homopolymer may be more simple and less costly than synthesizing a heteropolymer, synthesizing heteropolymeric, polyphosphazene compounds may produce taggants 6 having intermediate release profiles, which improves the versatility of the taggants 6 and enables taggants 6 to be produced for use in a variety of operations.

To further increase the holding capacity and provide a slower release rate, the polyphosphazene compound 4 may, optionally, include an internal cross-linking moiety. The internal cross-linking moiety may be a terminal olefinic species, such as an ortho allyl phenol moiety or an allyl oxy ethanol moiety. By way of non-limiting example, if the H group includes a perfluoroalkyl moiety, the internal cross-linking moiety may be located at the terminus of the perfluoroalkyl moiety. However, the internal cross-linking moiety may also be an additional pendant group covalently bonded directly to the phosphorus-nitrogen unit of the polyphosphazene compound 4. To produce a polyphosphazene compound 4 having the slowest release rate, the polyphosphazene compound 4 may include the internal cross-linking moiety in addition to substantially all H groups as the pendant groups.

The perfluorocarbon compound 2 may be a colorless material including carbon atoms and fluorine atoms. The perfluorocarbon compound 2 may have a high density, low viscosity, low surface tension, low heat of vaporization, and low refractive index. The boiling point of the perfluorocarbon compound 2 may range from about −40° C. to about 130° C. The perfluorocarbon compound 2 may be a solid, liquid, or a gas at ambient temperature and pressure. Since the taggant 6 is typically used at ambient temperature and pressure, the perfluorocarbon compound 2 may be a solid, liquid, or a gas at these conditions. Examples of perfluorocarbon compounds 2 include, but are not limited to, perfluorodimethylbutane, perfluorodimethylcyclobutane ("PDMCB"), perfluorohexane ("PH"), perfluorocyclohexane ("PCH"), perfluoromethylcyclohexane ("PMCH"), perfluorodimethylcyclohexane, perfluorotrimethylcyclohexane ("PTMCH"), perfluoromethylcyclopentane, perfluoropentane, perfluorooctane, perfluoro(1,2-dimethylcyclohexane) ("PD12MCH"), perfluoro(1,3-dimethylcyclohexane) ("PD13MCH"), perfluoro(1,4-dimethylcyclohexane), perfluoro(1,3,5-trimethylcyclohexane), perfluorodecalin ("PD"), perfluoromethyldecalin, octafluoropropane, hexafluoropropene, octafluorocyclobutane, hexafluorobenzene, octafluorotoluene, decafluorobiphenyl, decafluoroxylene, decafluorocyclohexene, octafluoronaphthalene, octafluorocyclopentene, pentafluoropyridene, perfluorododecane, or combinations thereof, such as a combination of octafluorotoluene and hexafluorobenzene. Such perfluorocarbon compounds 2 are commercially available from numerous sources, such as from Scott Specialty Gases (Plumsteadville, Pa.), AGA Gas Inc. (Cleveland, Ohio), Matheson Tri-Gas (Basking Ridge, N.J.), Lancaster Synthesis (Ward Hill, Mass.), F2 Chemicals Ltd. (Lancashire, UK), or Sigma-Aldrich Co. (St. Louis, Mo.).

The taggant 6 may include at least two perfluorocarbon compounds 2 if the desired use for the taggant 6 includes operations of both short duration and long duration. The perfluorocarbon compounds 2 may be sufficiently different that each of the perfluorocarbon compounds 2 is selectively detectable. The ability to produce a taggant 6 having multiple perfluorocarbon compounds 2 that are separately detectable may enable several intelligence scenarios to be conducted concurrently without cross-operational interference or contamination.

To further increase the release rate of the perfluorocarbon compound 2 from the polyphosphazene compound 4, the perfluorocarbon compound 2 may also be derivatized. By way of non-limiting example, to provide a taggant 6 having a relatively long release rate, ranging on the order of from months to years, the perfluorocarbon compound 2 may be derivatized to include a terminal functionality capable of reacting with the phosphorus-nitrogen unit of the polyphosphazene compound 4. By way of non-limiting example, the terminal functionality on the perfluorocarbon compound 2 may be a trifluoroethanol or pentafluoroethanol group, such that a trifluoroethoxy or a pentafluoroethoxy portion of the group reacts with the phosphorus-nitrogen unit of the polyphosphazene compound 4. The resulting taggant 6 may be non-emitting and, therefore, may be optically detected.

In addition, the polyphosphazene compound 4 may be a heteropolymer with labile R groups. The labile R groups may degrade the phosphorus-nitrogen units, enabling the release of the perfluorocarbon compound 2. The labile R groups may be readily susceptible to hydrolytic cleavage, such as halogen, methoxy, or primary amine groups.

If the taggant 6 is to be used in an operation of short duration, the taggant 6 may be configured such that the perfluorocarbon compound 2 becomes detectable shortly after production of the taggant 6. In such a taggant 6, the perfluorocarbon compound 2 may be incorporated or embedded in the polyphosphazene compound 4 such that the perfluorocarbon compound 2 diffuses through the polyphosphazene compound 4.

If the taggant 6 is to be used in an operation of long duration, the perfluorocarbon compound 2 of the taggant 6 may be maintained in a nondetectable state until detection is desired. Such a taggant 6 may include the perfluorocarbon compound 2 enclosed in the impermeable material 8, which is then surrounded by the polyphosphazene compound 4 and sealed. The impermeable material 8 is shown in FIG. 1 by dashed lines, which indicate that its presence is optional. As used herein, the term "impermeable material" means and includes a material that is substantially impermeable to diffusion of the perfluorocarbon compound 2 therethrough. While a trace amount of the perfluorocarbon compound 2 may permeate through the impermeable material 8, such amount may be below levels of detection. By preventing diffusion of the perfluorocarbon compound 2, the taggant 6 may be stored in the nondetectable state until detection is desired. The impermeable material 8 may be a glass, a ceramic, a metal material, or a metallized film of poly(ethylene terephthalate), the latter of which is commercially available from DuPont Teijin Films (Hopewell, Va.) under the MYLAR® trade name. The impermeable material 8 may be formed into a container in which the perfluorocarbon compound 2 is stored. By way of non-limiting example, the container may be a glass vial, glass capillary tube, or micro- or nano-sized beads. The container may be of a sufficient size to hold the desired amount of the perfluorocarbon compound 2, such as from about 100 μl to about 5 ml. The polyphosphazene compound 4 may be formed around the impermeable material 8, such as in the form of a pouch or reservoir. The impermeable material 8 may also be coated with the polyphosphazene compound 4 by dipping the container made from the impermeable material 8 into a solution of the polyphosphazene compound 4. The container made from the impermeable material 8 may have been previously filled with the perfluorocarbon compound 2 and sealed. Once dried, the polyphosphazene compound 4 may form a thin coating around the impermeable material 8, as shown in FIG. 5. The coating may be from approximately 20 µm to approximately 50 µm thick. When detection is desired, the impermeable material 8 may be compromised, such as by fracturing or rupturing the impermeable material 8, enabling permeation of the perfluorocarbon compound 2 through the polyphosphazene compound 4. To enable easy fracturing of the impermeable material 8, the container of the impermeable material 8 may be scored. Depending on the vapor pressure of the perfluorocarbon compound 2, the composition of the polyphosphazene compound 4, and the thickness of the film of the polyphosphazene compound 4 (which are selected based on the requirements of the mission), the perfluorocarbon compound 2 may be detectable as quickly as from seconds to minutes or as slowly as hours or months after compromising the integrity of the impermeable material 8. Once released, the perfluorocarbon compound 2 may be detectable for a variable amount of time, such as from hours to months.

The perfluorocarbon compound 2 of the taggant 6 may, alternatively, be contained in the absorbent material 10, as shown in FIG. 2. The absorbent material 10 includes, but is not limited to, filter paper, gauze, sponge, foam, a pad, or other absorbent paper or fabric. A desired volume of the perfluorocarbon compound 2 may be applied to the absorbent material 10, which is then surrounded by a film of the polyphosphazene compound 4 and sealed. The absorbent material 10 is shown in FIG. 2 by dashed lines, which indicates that its presence in the taggant 6 is optional.

To improve the shelflife of the taggant 6, another impermeable material (not shown) may be used to encase the taggant 6. By way of non-limiting example, the another impermeable material may be glass, a ceramic, a metal material, or a metallized film of poly(ethylene terephthalate), the latter of which is commercially available from DuPont Teijin Films (Hopewell, Va.) under the MYLAR® trade name. For instance, the taggant 6 may be enclosed in a MYLAR® bag and stored until use. Just before its use, the another impermeable material may be compromised, such as by tearing or otherwise opening, to expose the taggant 6 to the surrounding environment. The perfluorocarbon compound 2 may then permeate through the polyphosphazene compound 4 and be detected, as previously described.

To form the taggant 6, the perfluorocarbon compound 2 and the polyphosphazene compound 4 may be combined, such as by mixing, to produce a homogenous material in which the perfluorocarbon compound 2 is dispersed throughout the polyphosphazene compound 4, as shown in FIG. 4. Depending on the material used, the perfluorocarbon compound 2 may be a liquid or a gas at a temperature at which the taggant 6 is processed. As such, the perfluorocarbon compound 2 may be easily combined with the polyphosphazene compound 4. If the perfluorocarbon compound 2 is a solid at the processing temperature, the perfluorocarbon compound 2 may be dissolved, admixed, emulsified, or dispersed in a suitable solvent, such as a hydrocarbon solvent, before combining with the polyphosphazene compound 4. The solvent may be ethanol, acetone, toluene, xylene, isooctane, mineral oils, petroleum ether, or combinations thereof.

Alternatively, the taggant 6 may be a heterogeneous material in which the polyphosphazene compound 4 is formed around the perfluorocarbon compound 2, substantially encapsulating or encasing the perfluorocarbon compound 2, as shown in FIGS. 1-3. By way of non-limiting example, a film of the polyphosphazene compound 4 may be used to surround the perfluorocarbon compound 2. The film of the polyphosphazene compound 4 may be formed into a pouch or other enclosed reservoir in which the perfluorocarbon compound 2 is stored, and sealed. If the perfluorocarbon compound 2 is contained within the impermeable material 8 or the absorbent material 10, the impermeable material 8 or the absorbent material 10 may be enclosed within the film of the polyphosphazene compound 4. The perfluorocarbon compound 2 may be present in the taggant 6 at less than 500 parts per billion ("ppb"), such as less than about 250 ppb, such as from about 10 ppb to about 100 ppb.

The taggant 6 may be used in clandestine chemical tagging and tracking operations, such as those conducted by law enforcement and national security personnel, to mark an object. The taggant 6 may be applied to, placed in, or adhered to at least a portion of the object, which may include, but is not limited to, currency, clothing, drugs, weapons, crops, chemical compounds, vehicles, goods in commerce, letters, parcels, briefcases, paper documents, and people. In one embodiment, the taggant 6 is configured as a patch that is attached to a uniform or other article of clothing. The patch may include an amount of the perfluorocarbon compound 2 enclosed in the impermeable material 8, such as in a glass ampoule or a pouch formed from the metalized film of poly(ethylene terephthalate). The impermeable material 8 may be surrounded by the film formed from the polyphosphazene compound 4, or the polyphosphazene compound 4 may be applied as a coating on the outer surface of the impermeable material 8. Alternatively, the patch may include an amount of the perfluorocarbon compound 2 enclosed in the film formed from the polyphosphazene compound 4. The perfluorocarbon compound 2 may be contained in the absorbent material 10, which is also enclosed in the film formed from the polyphosphazene compound 4. In another embodiment, the taggant 6 is configured into micro- or nano-sized beads in which the perfluorocarbon compound 2 is substantially encased by a layer of the polyphosphazene compound 4. In yet another embodiment, if the taggant 6 is a wax-like material, the taggant 6 may be contacted with the object, forming a transparent coating or film of the polyphosphazene compound 4 and the perfluorocarbon compound 2 on the object, similar to crayon markings on paper.

Since the perfluorocarbon compound 2 is volatile, vapors of the perfluorocarbon compound 2 may be released from the polyphosphazene compound 4 over time. Depending on the materials used as the polyphosphazene compound 4 and the perfluorocarbon compound 2, the vapors of the perfluorocarbon compound 2 may be released quickly or slowly. As previously described, if the pendant groups on the polyphosphazene compound 4 include substantially all R groups, the perfluorocarbon compound 2 may have a fast release rate from the polyphosphazene compound 4. Conversely, if the pendant groups on the polyphosphazene compound 4 include substantially all H groups, the perfluorocarbon compound 2 may have a slow release rate from the polyphosphazene compound 4. The release rate of the perfluorocarbon compound may also be affected by the surface area and thickness of the polyphosphazene compound and by atmospheric conditions in the environment in which the taggant is used. For instance, the temperature, humidity, or wind speed of the surrounding environment may also affect the release rate of the perfluorocarbon compound. After the concentration of perfluorocarbon compound 2 reaches a steady state in the environment surrounding the tagged object, the vapors of the perfluorocarbon compound 2 may become detectable. Since the vapors of the perfluorocarbon compound 2 may permeate closed doors and windows, containers, and luggage, the perfluorocarbon compound 2 may be detected even if the object is enclosed in a container or in a building. The vapors of the perfluorocarbon compound 2 may be detected by a known detection technique, such as by gas chromatography, electronic capture detector, direct sampling ion trap mass spectrometry, optical (infrared, visible, and ultraviolet) spectroscopy, UV laser-induced fluorescence, or other technique capable of detecting the perfluorocarbon compound 2.

The perfluorocarbon compound 2 may be released through the polyphosphazene compound 4 at a rate determined by the materials used as the perfluorocarbon compound 2 and the polyphosphazene compound 4. The release rate may be a function of the material used as the polyphosphazene compound 4, the material used as the perfluorocarbon compound 2, and the thickness of the polyphosphazene compound 4. By appropriately selecting the materials, the release profile of the perfluorocarbon compound 2 may be tailored as desired. Without being bound to a particular theory, it is believed that selection of the polyphosphazene compound 4 may provide coarse control to the release rate of the perfluorocarbon compound 2 while selection of the perfluorocarbon compound 2 may provide fine control to the release rate. For a particular perfluorocarbon compound 2, by appropriately selecting the polyphosphazene compound 4, a factor of greater than about 250 times may be observed between the slowest release rate and the fastest release rate. For a particular polyphosphazene compound 4, by appropriately selecting the perfluorocarbon compound 2, a factor of greater than about 2 times may be observed for the slowest rate to the fastest rate.

Depending on the materials used for the perfluorocarbon compound 2 and the polyphosphazene compound 4, the taggant 6 may have a maintainable lifetime of at least about one week, such as about one month or longer, after being produced. If the taggant 6 is applied to the object almost immediately after production, the perfluorocarbon compound 2 may be detectable when released from the taggant 6 over a time period of greater than about one week, such as from about one month to about twelve months. If the half-life and release profile of the taggant 6 is shorter, such as on the order of days, the taggant 6 may have a limited lifetime. However, such taggants 6 may be useful in operations of short duration. If the release profile of the taggant 6 is longer, such as on the order of more than twelve months, the rate of release of perfluorocarbon compound 2 from the taggant 6 may be low and, accordingly, a greater amount of the perfluorocarbon compound 2 may be utilized in the taggant 6 to achieve detectable concentrations in the surrounding environment.

When the taggant 6 includes the impermeable material 8 containing the perfluorocarbon compound 2, the perfluorocarbon compound 2 may initially be in an undetectable state because little or substantially no perfluorocarbon compound 2 passes through the impermeable material 8. However, when detection is needed, the taggant 6 may be subjected to sufficient force or other selected action to compromise the integrity of the impermeable material 8. The force applied to the taggant 6 may be sufficient to form at least one pinhole or void in the impermeable material 8 without substantially damaging the film of the polyphosphazene compound 4. Since the release profile of the perfluorocarbon compound 2 from the taggant 6 is, in part, a function of the polyphosphazene compound 4, the polyphosphazene compound 4 may be maintained substantially intact to ensure that the perfluorocarbon compound 2 permeates through the polyphosphazene compound 4. For instance, if the taggant 6 is configured as a patch and includes a glass ampoule as the impermeable material 8, a wearer of the uniform may strike or otherwise contact the patch when detection is needed. Alternatively, if the impermeable material 8 is formed from the metalized film of poly(ethylene terephthalate), the patch may be torn by the wearer when detection is needed. If an impermeable material 8 is not utilized in the taggant 6, the perfluorocarbon compound 2 may begin to be released from the polyphosphazene compound 4 as soon as the taggant 6 is produced.

Since the taggant 6 is not visually detectable, the taggant 6 may also be used to determine whether a sample of interest has been contaminated, adulterated, or diluted. The taggant 6 may be added to the sample and a concentration of the perfluorocarbon compound 2 in the sample of interest may be compared to a control sample. The control sample is a sample that is not contaminated, adulterated, or diluted and that has a known concentration of the perfluorocarbon compound 2.

The following examples serve to explain embodiments of the taggant 6 in more detail. These examples are not to be construed as being exhaustive or exclusive as to the scope of this invention.

EXAMPLES

Example 1

The permeability of perfluoro(1,3-dimethylcyclohexane) through various polyphosphazene compounds was determined by calculating its diffusion coefficient through a membrane formed from the indicated polyphosphazene compound. The polyphosphazene compound used to form the membranes had a molecular weight of from about 900,000 Daltons to about 1,100,000 Daltons. To determine the diffusion coefficients, a first side of the membrane was exposed to pure helium. A valve was opened to expose the membrane to a known concentration of the perfluoro(1,3-dimethylcyclohexane) in a carrier stream of helium. The presence of perfluoro(1,3-dimethylcyclohexane) was detected by Membrane Introduction Mass Spectrometry (MIMS) as the perfluoro(1,3-dimethylcyclohexane) penetrated the membrane. The detection signal leveled off rapidly as steady state permeation of the perfluoro(1,3-dimethyl-cyclohexane) through the membrane was achieved. The values for the whole curve were normalized against the steady state value. A formula was used to calculate the diffusion coefficient based upon the amount of time elapsed between the start of the run and where the signal strength was 50% of the maximum steady state value. The diffusion coefficient was calculated according to the following formula:

$$\text{diffusion coefficient} = 0.14(\text{thickness}^2/\text{time}(50)),$$

where the thickness is the thickness of the polyphosphazene compound membrane and time is the amount of time elapsed between the start of the run and where the signal strength was 50% of the maximum steady state value. The diffusion constants for perfluoro(1,3-dimethylcyclo-hexane) through the polyphosphazene compounds are shown in Table 1 and are compared to the diffusion constant for perfluoro(1,3-dimethylcyclohexane) through a silicone rubber, PDMS.

TABLE 1

Diffusion constants for perfluoro(1,3-dimethylcyclohexane) through the indicated polyphosphazene compounds.

| Polyphosphazene compound | Diffusion Constant (cm/sec) |
|---|---|
| 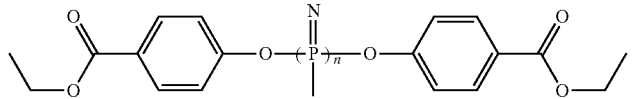<br>poly(bis p-ethylformylphenoxy)phosphazene | 0 |
| 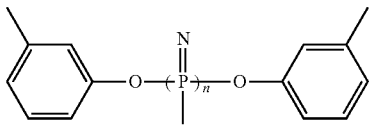<br>poly(bis m-methylphenoxy)phosphazene | 8.78E-08 |
| 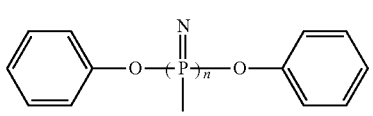<br>poly(bis phenoxy)phosphazene | 0 |
| 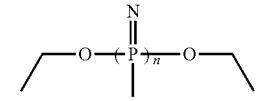<br>poly(bis trifluoroethoxy)phosphazene | 1.56E-08 |
| 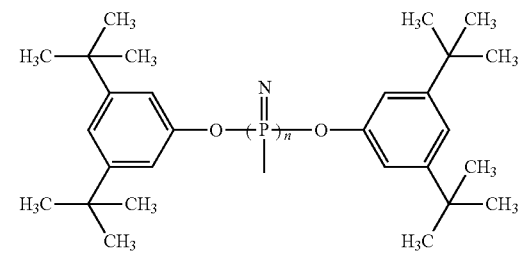<br>poly(bis 2,4-di-tert-butyl phenoxy)phosphazene | 1.11E-07 |
| 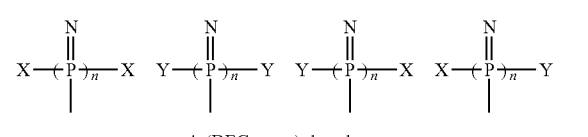<br>poly(DEG sugar)phosphazene<br>X = sugar<br>Y = diethylene glycol | 4.07E-07 |
| 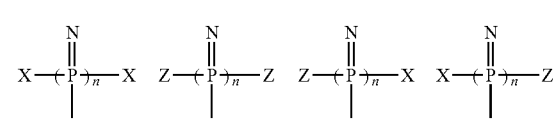<br>poly(40% sugar-60% trifluoroethoxy)phosphazene<br>X = sugar<br>Y = trifluoroethoxy | 0 |

TABLE 1-continued

Diffusion constants for perfluoro(1,3-dimethylcyclohexane)
through the indicated polyphosphazene compounds.

| Polyphosphazene compound | Diffusion Constant (cm/sec) |
|---|---|
| PDMS (H₃C, CH₃ on Si, with O linkages, n repeating) | 4.38E−07 | n = 100-10000
X = diacetone D-glucofuranose

As shown in Table 1, the permeability of the perfluoro(1,3-dimethylcyclohexane) varied with the different polyphosphazene compound used. A comparison of the diffusion constant of the perfluoro(1,3-dimethylcyclohexane) through poly(bis p-ethylformylphenoxy)phosphazene versus through poly(bis m-methylphenoxy)phosphazene, which differ in that a polar ester functionality is present on the phenoxy group of poly(bis p-ethylformylphenoxy)phosphazene while a methyl group is present on the phenoxy group of poly(bis m-methylphenoxy)phosphazene, shows that the former has a substantially slower diffusion rate than the latter. A comparison of the diffusion constant of perfluoro(1,3-dimethylcyclohexane) through poly(bis phenoxy)phosphazene versus through poly(bis trifluoroethoxy)phosphazene, which differ in that a phenoxy group is present in poly(bis phenoxy)phosphazene while a trifluoroethoxy group is present in poly(bis trifluoroethoxy)phosphazene, shows that the former has a substantially slower diffusion rate than the latter. A comparison of the diffusion constant of perfluoro(1,3-dimethylcyclohexane) through poly(bis phenoxy)phosphazene versus through poly(bis 2,4-ditert-butyl phenoxy)phosphazene, which differ in that a phenoxy group is present in poly(bis phenoxy)phosphazene while a 2,4-ditert-butyl phenoxy group is present in poly(bis 2,4-ditert-butyl phenoxy)phosphazene, shows that the former has a substantially slower diffusion rate than the latter. A comparison of the diffusion constant of perfluoro(1,3-dimethylcyclohexane) through a poly(DEG sugar)phosphazene versus through a poly(40% sugar-60% trifluoroethoxy) phosphazene, which differ in that a diethylene glycol group is present in the poly(DEG sugar) phosphazene while a trifluoroethoxy group is present in the poly(40% sugar-60% trifluoroethoxy)phosphazene, shows that the latter has a substantially slower diffusion rate than the former.

Example 2

The permeability of perfluoro(1,3-dimethylcyclohexane) through membranes formed from PDMS, a silicone rubber, and poly(bis trifluoroethoxy)phosphazene ("TFE"), a polyphosphazene compound, was determined by calculating the diffusion coefficients as previously described. The permeability of perfluoro(1,3-dimethylcyclohexane) was tested using a concentration of 5111 ppm (concentration 1) and 920 ppm (concentration 2). The diffusion coefficients (y axis) were normalized to 1. As shown in FIG. 6, perfluoro(1,3-dimethylcyclo-hexane) passed more quickly through the PDMS membrane than through the poly(bis trifluoroethoxy) phosphazene membrane.

Example 3

The diffusion constants of eight perfluorocarbon compounds through each of PDMS and poly(bis trifluoroethoxy) phosphazene were determined. The diffusion constants are shown in Table 2.

TABLE 2

Diffusion constants for various perfluorocarbon compounds through PDMS and poly(bis trifluoroethoxy)phosphazene.

| Perfluorocarbon compound | PDMS (cm²/sec) | poly(bis trifluoroethoxy)phosphazene (cm²/sec) |
|---|---|---|
| Perfluorohexane | 5.14E−07 | 1.30E−08 |
| Perfluorodimethylbutane | 5.33E−07 | 8.84E−09 |
| Perfluorocyclohexane | 2.52E−07 | 8.49E−09 |
| Perfluoromethylcyclohexane | 4.55E−07 | 6.06E−09 |
| Perfluoro(1,2-dimethylcyclohexane) | 4.15E−07 | 3.76E−09 |
| Perfluoro(1,3-dimethylcyclohexane) | 4.38E−07 | 4.79E−09 |
| Perfluoro(1,3,5-trifluorocyclohexane) | 3.98E−07 | 3.02E−09 |
| Perfluorodecalin | 3.52E−07 | 3.04E−09 |

As shown by the diffusion coefficients, the perfluorocarbon compounds passed more quickly through the PDMS than through the poly(bis trifluoroethoxy)phosphazene.

Example 4

The diffusion constants of eight perfluorocarbon compounds through membranes formed from various polymers were determined. The polyphosphazene compound tested was poly(bis trifluoroethoxy)phosphazene, the copolymer of vinylidenefluoridehexafluoropropylene tested was VITON®, the polystyrene tested was TRYCITE®, the polysulfone tested was UDEL® P-3500, and the vinyl rubber tested was from vinyl FISHERBRAND® Exam gloves. The diffusion constants are shown in Table 3.

TABLE 3

Diffusion constants for various perfluorocarbon compounds through various polymers.

| | Copolymer of vinylidene-fluoride-hexafluoro-propylene (cm²/sec) | PDMS (cm²/sec) | Poly-styrene (cm²/sec) | Poly-sulfone (cm²/sec) | Vinyl rubber (cm²/sec) | poly(bis trifluoro-ethoxy)-phosphazene (cm²/sec) |
|---|---|---|---|---|---|---|
| Perfluorohexane | | 5.1E−07 | | | | |
| Perfluorodimethyl-cyclobutane | 2.04E−06 | 5.3E−07 | | 6.69E−08 | | |
| Perfluorocyclohexane | | 2.5E−07 | | | | 3.51E−09 |
| Perfluoromethylcyclo-hexane | | 4.5E−07 | | | | |
| Perfluoro(1,2-dimethylcyclohexane) | | 4.1E−07 | | | | |
| Perfluoro(1,3-dimethylcyclohexane) | 1.65E−06 | 4.3E−07 | 1.28E−08 | 5.43E−08 | 6.15E−08 | 6.03E−09 |
| Perfluoro(1,3,5-trifluorocyclohexane) | | 3.9E−07 | | | | |
| Perfluorodecalin | | 3.5E−07 | | | 5.00E−08 | |

As shown by the range of diffusion coefficients, the diffusion of the perfluorocarbon compound through the different polymers varies by a factor of greater than approximately 600.

Example 5

The diffusion constants of PD13MCH through various polymers were also determined. The diffusion constants are shown in Table 4.

TABLE 4

Diffusion constants for PD13MCH through various polymers.

| Polymer Materials | Thickness (microns) | PD13MCH concentration (ppm) | Diffusion Co-efficient (cm²/sec) |
|---|---|---|---|
| PDMS | 485 | 920 (p75 bag) | 3.56E−07 |
| PDMS | 247 | 920 (p75 bag) | 3.72E−07 |
| PDMS | 247 | 5111 (p.86 bag) | 1.29E−06 |
| PDMS | 482 | 5111 (p.86 bag) | 3.53E−07 |
| Trifluoroethoxyphosphazene | 72 | 920 (p75 bag) | 6.03E−09 |
| Trifluoroethoxyphosphazene | 91 | 920 (p75 bag) | 1.50E−08 |
| DEG-sugar derivative[1] | 160 | 5111 (p.86 bag) | 8.23E−07 |
| poly(bis 2,4-di-tert-butyl phenoxy)phosphazene | 89 | 920 (p75 bag) | 1.11E−07 |
| poly(bis m-methyl-phenoxy)phosphazene | 80 | 5111 (p.86 bag) | 8.78E−08 |
| UDEL ® P-3500 polysulfone | 65 | 920 (p.67) | 5.43E−08 |
| Vinyl FISHERBRAND ® Exam Gloves | 105 | 1000 (p. 58) | 6.15E−08 |
| Eagle VITON ® | 259 | 5111 (p.86 bag) | 7.83E−07 |
| Eagle VITON ® | 259 | 5111 (p.86 bag) | 1.65E−06 |
| TRYCITE ® polystyrene | 32 | 5111 (p.86 bag) | 1.28E−08 |
| DEG-sugar derivative[1] | 16 | 5111 p86 | 4.07E−07 |
| poly(bis trifluoroethoxy)phosphazene | 91 | 5111 p86 | 1.56E−08 |

[1] 29% diacetone-d-glucofuranose, 53% DEG, and 18% o-allyl phenol

Example 6

The permeability of perfluorohexane (a perfluorocarbon compound) versus propane (a hydrocarbon) through PDMS was determined by calculating the diffusion coefficients as previously described. The permeability for perfluorohexane was 3000 barrers while that for propane was 500 barrers. As such, the perfluorohexane was about an order of magnitude less permeable through PDMS than the propane.

Example 7

The permeation of various perfluorocarbon compounds (PTMCH, PDMCB, PMCH, PD12MCH, PD13MCH, PH, PCH, and PD) through PDMS was measured. Multilayered, aluminized polymer bags were used to contain each of the above-mentioned eight perfluorocarbon compounds. Each bag was filled with 10 liters of helium and then the desired amount of the perfluorocarbon compound was injected into the bag to produce a mixture of 5000 ppm (moles of perfluorocarbon to moles of helium). Each bag, in turn, was attached to a mass flow meter set at 1 ml/min leading into the MIMS. The flow of each bag's contents was directed across the top of a PDMS membrane. All of the material that passed through the PDMS membrane flowed directly into the analyzer of the MIMS. As shown in FIG. 7, the perfluorocarbon compounds had substantially different permeation rates or release rates through the PDMS membrane, supporting the assertion that the permeation rate of the perfluorocarbon compound through the membrane is affected by the composition of the perfluorocarbon compound.

Example 8

Figure 8:
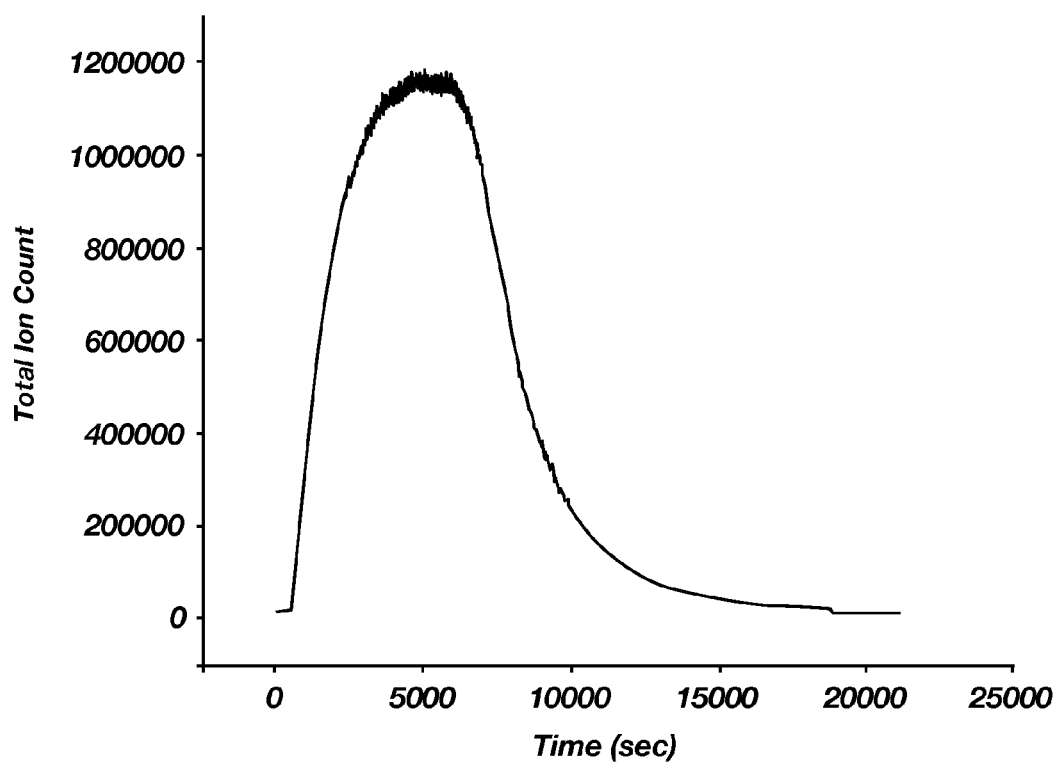
FIG. 8 is a graph illustrating the permeability of perfluoro (1,3-dimethyl-cyclohexane) through polydimethylsiloxane.

The ability to detect PD13MCH over time was measured. A glass ampoule was filled with 5 μl of PD13MCH and the filled glass ampoule was placed in a pouch formed from PDMS. The concentration of the perfluorocarbon compound in the pouch was 5000 ppm. The pouch was sealed in a small-volume aluminized MYLAR® bag, which was sealed shut. The aluminized MYLAR® bag was equipped with two ports, one served as an inlet for helium flow across the pouch and the other port served as an outlet into a mass spectrometer for detection of the perfluorocarbon compound. The flow rate was set at 4 ml per minute. To initiate release of the PD13MCH, the aluminized MYLAR® bag and pouch were bent, breaking the glass ampoules containing the PD13MCH. To determine release of the PD13MCH through the PDMS, data was continuously collected after breaking the glass ampoules, through the permeation lifetime of the prototype, until a detectable signal was no longer received. As shown in FIG. 8, about 10 minutes elapsed before the emission of the PD13MCH reached detectable levels. The detection limit was approximately 1 ppm. Emission continued to increase rapidly to reach equilibrium emission levels, remained steady for a time, and then slowly tailed off as the reservoir of taggant was exhausted. The duration of "peak" emissions (greater than half the observed maximum) lasted approximately 6500 seconds, which is nearly 2 hours. The total time of detectable permeation of the PD13MCH was found to be nearly 20,000 seconds, about 5½ hours.

Example 9

Taggants that included different perfluorocarbon compounds (PD13MCH, PMCH, or PH) and PDMS as the membrane were tested to determine their respective release profiles. The membrane (surface area of 34 square cm) was sealed around 3 ml of the respective perfluorocarbon compound loaded onto an absorbent pad. The taggant was placed in a pouch formed from MYLAR®, which was sealed. Each of the pouches was placed into a digital microbalance and weighed. A data logger was attached to the microbalance and the pouch was opened by tearing the pouch. The data logger periodically recorded the weight of the pouch until the weight loss halted, indicating all of the perfluorocarbon compound had been released from the taggant. The weight of the pouch was monitored for about 12 hours.

Figure 9:
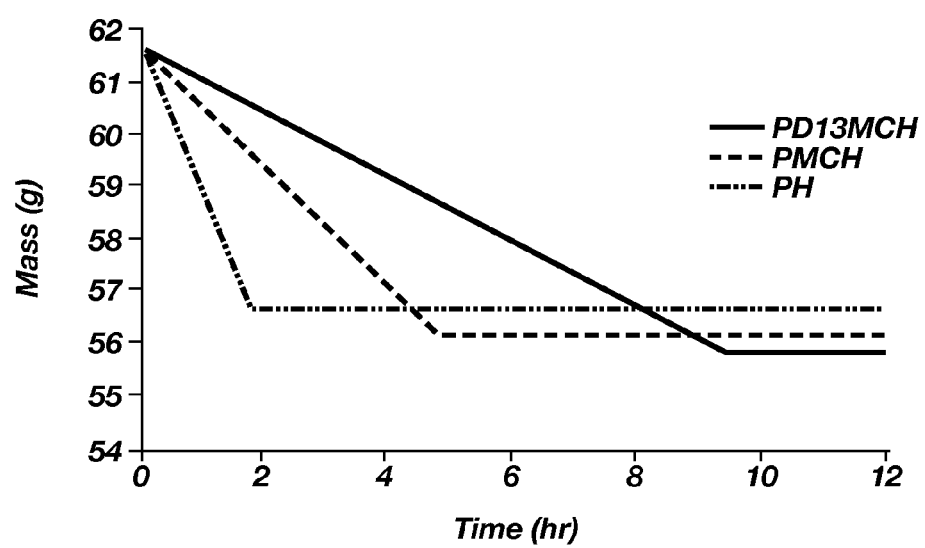
FIG. 9 is a graph illustrating the permeation of various perfluorocarbon compounds through polydimethylsiloxane.

As shown in FIG. 9, each of the perfluorocarbon compounds was released through the membrane at a different release rate. The taggant containing the PD13MCH was released over about 9.4 hours, the taggant containing the PMCH was released over about 4.8 hours, and the taggant containing the PH was released over about 1.8 hours. The taggant containing the PD13MCH lost about 11300 µl of vapor per minute, the taggant containing the PMCH lost about 24000 µl of vapor per minute, and the taggant containing the PH lost about 55000 µl of vapor per minute. The taggant containing the PD13MCH lost about 330 µl of vapor per minute per $cm^2$ area, the taggant containing the PMCH lost about 700 µl of vapor per minute per $cm^2$ area, and the taggant containing the PH lost about 1600 µl of vapor per minute per $cm^2$ area.

Example 10

The permeability, diffusivity, and solubility of various perfluorocarbon compounds (PDMCB, PH, PMCH, PD13MCH, PTMCH, or PD) through PDMS, TFE, or natural rubber was measured as previously described. Table 5 shows the permeability, diffusivity, and solubility of the perfluorocarbon compounds through PDMS, TFE, or natural rubber.

TABLE 5

Permeability, Diffusivity, and Solubility of Various Perfluorocarbon Compounds through PDMS, TFE, or Natural Rubber.

| Polymer and perfluorocarbon compound | Permeability (barrers) | (cc * cm * $sec^{-1}$ * $cm^{-2}$ * cm Hg) | Diffusivity ($cm^2$/sec) | Solubility ($cm^3/cm^3$ * cm Hg) |
|---|---|---|---|---|
| PDMS | | | | |
| PDMCB | 451 | $4.51 \times 10^{-8}$ | $5.33 \times 10^{-7}$ | $8.46 \times 10^{-2}$ |
| PH | 736 | $7.36 \times 10^{-8}$ | $5.14 \times 10^{-7}$ | $1.43 \times 10^{-1}$ |
| PMCH | 1168 | $1.17 \times 10^{-7}$ | $4.55 \times 10^{-7}$ | $2.57 \times 10^{-1}$ |
| PD13MCH | 1919 | $1.92 \times 10^{-7}$ | $4.38 \times 10^{-7}$ | $4.38 \times 10^{-1}$ |
| PTMCH | 2366 | $2.37 \times 10^{-7}$ | $3.98 \times 10^{-7}$ | $5.94 \times 10^{-1}$ |
| PD | 4989 | $4.99 \times 10^{-7}$ | $3.52 \times 10^{-7}$ | 1.42 |
| TFE | | | | |
| PDMCB | 11 | $1.09 \times 10^{-9}$ | $8.84 \times 10^{-9}$ | $1.23 \times 10^{-1}$ |
| PH | 13 | $1.29 \times 10^{-9}$ | $1.30 \times 10^{-8}$ | $9.93 \times 10^{-2}$ |
| PMCH | 12 | $1.16 \times 10^{-9}$ | $6.06 \times 10^{-9}$ | $1.91 \times 10^{-1}$ |
| PD13MCH | 14 | $1.40 \times 10^{-9}$ | $4.79 \times 10^{-9}$ | $2.91 \times 10^{-1}$ |
| PTMCH | 15 | $1.50 \times 10^{-9}$ | $3.02 \times 10^{-9}$ | $4.98 \times 10^{-1}$ |
| PD | 20 | $2.00 \times 10^{-9}$ | $3.04 \times 10^{-9}$ | $6.58 \times 10^{-1}$ |
| Natural Rubber | | | | |
| PDMCB | 0 | $4.30 \times 10^{-11}$ | $1.84 \times 10^{-8}$ | $2.33 \times 10^{-3}$ |
| PH | 2 | $2.11 \times 10^{-10}$ | $3.04 \times 10^{-8}$ | $6.94 \times 10^{-3}$ |
| PMCH | 10 | $1.04 \times 10^{-9}$ | $2.18 \times 10^{-8}$ | $4.77 \times 10^{-2}$ |
| PD13MCH | 14 | $1.39 \times 10^{-9}$ | $2.73 \times 10^{-8}$ | $5.07 \times 10^{-2}$ |
| PTMCH | 100 | $9.97 \times 10^{-9}$ | $1.51 \times 10^{-8}$ | $6.59 \times 10^{-1}$ |
| PD | 8 | $7.71 \times 10^{-10}$ | $1.64 \times 10^{-8}$ | $4.69 \times 10^{-2}$ |

The permeability of PD13MCH was also measured using nitrile rubber, polysulfone (UDEL® P-3500), poly(phenylethoxyphosphazene), MATRIMID®, vinyl rubber exam gloves, or polystyrene as the polymer. PD13MCH was found to have little permeability through these materials.

While the invention is susceptible to various modifications as well as alternative forms and implementations, specific embodiments have been shown by way of example in the drawings and have been described in detail herein. However, the invention is not intended to be limited to the particular forms and embodiments disclosed. Rather, the invention, in various embodiments, is to cover all modifications, equivalents, and alternatives falling within the scope of the invention as defined by the following appended claims and their legal equivalents.

What is claimed is:

1. A taggant comprising:
   at least one perfluorocarbon compound and a polyphosphazene compound, the at least one perfluorocarbon compound surrounded by the polyphosphazene compound and the polyphosphazene compound configured as a pouch and containing the at least one perfluorocarbon compound.

2. A taggant comprising:
   at least one perfluorocarbon compound and a polyphosphazene compound, the at least one perfluorocarbon compound surrounded by the polyphosphazene compound and the at least one perfluorocarbon compound enclosed in a container formed from an impermeable material.

3. The taggant of claim 2, wherein the container further comprises a coating of the polyphosphazene compound on an outer surface thereof.

4. The taggant of claim 1, wherein the at least one perfluorocarbon compound is absorbed onto an absorbent material contained within the taggant.

5. The taggant of claim 1, wherein the polyphosphazene compound substantially encapsulates the at least one perfluorocarbon compound.

6. The taggant of claim 1, wherein the at least one perfluorocarbon compound is incorporated into the polyphosphazene compound.

7. The taggant of claim 1, wherein the at least one perfluorocarbon compound is homogeneously dispersed throughout the polyphosphazene compound.

8. The taggant of claim 1, wherein the polyphosphazene compound comprises the following chemical structure:

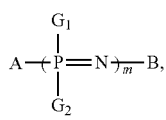

wherein $G_1$ and $G_2$ are pendant groups having different polarities, m is an integer greater than or equal to 100, and each of A and B is independently selected from hydrogen, an alkyl, an alkene, an alkoxide, a polyether, a polythioether, a siloxane, and $—X(CH_2)_nY^1(CH_2)p_1Y^2(CH_2)p_2\ldots Y^i(CH_2)p_iCH_3$, where n ranges from 1 to 6, X and Y are independently selected from oxygen, sulfur, selenium, tellurium, and polonium, and $p_1$ through $p_i$ range from 1 to 6.

9. The taggant of claim 1, wherein the polyphosphazene compound comprises the following chemical structure:

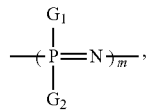

wherein $G_1$ and $G_2$ are pendant groups having different polarities and m is an integer greater than or equal to 100.

10. A taggant comprising:
at least one perfluorocarbon compound encased in a polyphosphazene compound, the polyphosphazene compound comprising the following chemical structure:

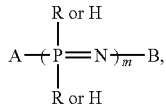

wherein R and H are independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido such that R is more polar than H, m is an integer greater than or equal to 100, and each of A and B is independently selected from hydrogen, an alkyl, an alkene, an alkoxide, a polyether, a polythioether, a siloxane, and $—X(CH_2)_nY^1(CH_2)p_1Y^2(CH_2)p_2\ldots Y^i(CH_2)p_iCH_3$, where n ranges from 1 to 6, X and Y are independently selected from oxygen, sulfur, selenium, tellurium, and polonium, and $p_1$ through $p_i$ range from 1 to 6, wherein the polyphosphazene compound is configured as a pouch and contains the at least one perfluorocarbon compound.

11. A taggant comprising:
at least one perfluorocarbon compound surrounded by a polyphosphazene compound, the polyphosphazene compound comprising the following chemical structure:

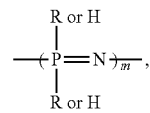

wherein R and H are independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido such that R is more polar than H and m is an integer greater than or equal to 100, wherein the polyphosphazene compound comprises an internal cross-linking moiety.

12. The taggant of claim 11, wherein R and H are independently selected from the group consisting of trifluoromethyl phenoxy, phenoxy, formyl phenoxy, methylphenoxy, trifluoroethoxy, 2,4-di-tert-butyl phenoxy, diethylene glycol, a saccharide, oxyphenyl$CO_2H$, -oxyphenyl$SO_3H$, oxyphenylhydroxyl, and oxyphenyl$PO_3H$.

13. The taggant of claim 11, wherein the polyphosphazene compound comprises:

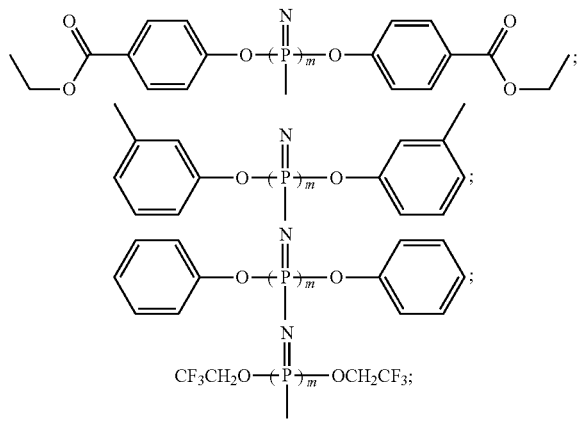

-continued

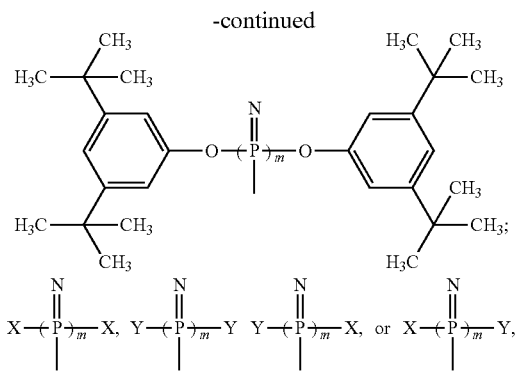

where X=a sugar derivative and
Y=diethylene glycol;

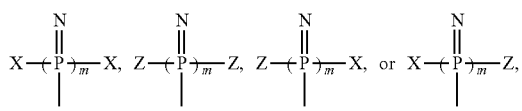

where
X=a sugar derivative and Z=trifluoroethoxy; or combinations thereof.

14. The taggant of claim 10, wherein the polyphosphazene compound further comprises an internal cross-linking moiety.

15. The taggant of claim 11, wherein the at least one perfluorocarbon compound further comprises a terminal functionality capable of reacting with the polyphosphazene compound.

16. The taggant of claim 11, further comprising an impermeable material containing the at least one perfluorocarbon compound.

17. The taggant of claim 11, wherein the taggant further comprises a polymer selected from the group consisting of a fluoroelastomer, a polysilicone, a polyaromatic, a polysulfone, a polyaliphatic, and a thermoplastic polymer.

18. A taggant comprising:
at least one perfluorocarbon compound incorporated into a heteropolymeric polyphosphazene compound, the heteropolymeric polyphosphazene compound comprising:
a plurality of phosphorous-nitrogen units having a double bond between each phosphorus atom and each nitrogen atom of the phosphorous-nitrogen units, each of the plurality of phosphorous-nitrogen units bonded to an adjacent phosphorous-nitrogen unit by a single bond, wherein at least two pendant groups are bonded to each phosphorus atom of each phosphorous-nitrogen unit, the at least two pendant groups having different polarities.

19. The taggant of claim 18, wherein the heteropolymeric polyphosphazene compound comprises the following chemical structure:

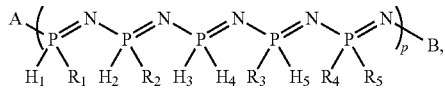

wherein:
each of A and B is independently selected from the group consisting of hydrogen, an alkyl, an alkene, an alkoxide, a polyether, a polythioether, a siloxane, and —X(CH$_2$)$_n$Y$^1$(CH$_2$)p$_1$ Y$^2$(CH$_2$)p$_2$ . . . Y$^i$(CH$_2$)p$_i$CH$_3$, where n ranges from 1 to 6, each of X and Y is independently selected from the group consisting of oxygen, sulfur, selenium, tellurium, and polonium, and p$_1$ through p$_i$ range from 1 to 6;

each of H$_1$ through H$_5$ and R$_1$ through R$_5$ is independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido such that each R bonded to a phosphorus atom is more polar than each H bonded to the same phosphorus atom; and p is an integer greater than or equal to 20.

20. The taggant of claim 18, wherein the at least two pendant groups are independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido.

21. A method of forming a taggant, comprising:
producing a polyphosphazene compound comprising the following chemical structure:

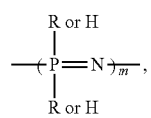

wherein R and H are independently selected from the group consisting of alkyl, alkenyl, alkynyl, alkoxy, amino, alkylamino, alkylarylamino, dialkylamino, alkylthio, alkarylthio, aryl, arylamino, diarylamino, aryloxy, aralkyl, alkaryl, aralkoxy, alkaryloxy, arylthio, arylthio acyl, acylamino, acyloxy, amino acid, carbamoyl, carbonamido, carboxyl, cyano, formyl, glycol, halogen, heteroalkyl, heteroaralkyl, heteroaryl, hydroxyl, nitro, oxy(aliphatic), oxy(aliphatic)hydroxyl, oxy(alkyl)hydroxyl, oxycarbonyl, oxysulfonyl, perfluoroalkyl, phosphate, a saccharide, sulfamoyl, sulfonamido, sulfonylamino, sulfonyl, sulfoxide, thio, thioalkaryl, thioaralkyl, trifluoroalkyl, and ureido such that R is more polar than H, m is an integer greater than or equal to 100, and each of A and B is independently selected from hydrogen, an alkyl, an alkene, an alkoxide, a polyether, a polythioether, a siloxane, and —X(CH$_2$)$_n$Y$^1$(CH$_2$)p$_1$Y$^2$(CH$_2$)p$_2$ . . . Y$^i$(CH$_2$)p$_i$CH$_3$, where n ranges from 1 to 6, X and Y are independently selected from oxygen, sulfur, selenium, tellurium, and polonium, and p$_1$ through p$_i$ range from 1 to 6; and surrounding at least one perfluorocarbon compound with the polyphosphazene compound.

22. The method of claim 21, wherein surrounding at least one perfluorocarbon compound with the polyphosphazene compound comprises forming a film of the polyphosphazene compound around the at least one perfluorocarbon compound.

23. The method of claim 21, further comprising enclosing the at least one perfluorocarbon compound in an impermeable material.

24. The method of claim 21, further comprising absorbing the at least one perfluorocarbon compound onto an absorbent material.

25. A method of detecting an object, comprising:
applying a taggant to an object, the taggant comprising at least one perfluorocarbon compound contained within a polyphosphazene compound; and
detecting the taggant by release of the at least one perfluorocarbon compound through the polyphosphazene compound.

26. The method of claim 25, wherein the taggant further comprises an impermeable material encasing the at least one perfluorocarbon compound.

27. The method of claim 26, further comprising rupturing the impermeable material encasing the at least one perfluorocarbon compound before detecting the at least one perfluorocarbon compound.

28. The method of claim 25, wherein detecting the taggant comprises detecting the at least one perfluorocarbon compound by at least one of gas chromatography, electronic capture detector, direct sampling ion trap mass spectrometry, infrared spectroscopy, visible spectroscopy, ultraviolet spectroscopy, and UV laser-induced fluorescence.

29. A taggant comprising:
at least one perfluorocarbon compound and a polyphosphazene compound, the at least one perfluorocarbon compound surrounded by the polyphosphazene compound and the polyphosphazene compound comprising one of the following chemical structures:

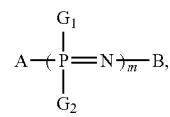

wherein $G_1$ and $G_2$ are pendant groups having different polarities, m is an integer greater than or equal to 100, and each of A and B is independently selected from hydrogen, an alkyl, an alkene, an alkoxide, a polyether, a polythioether, a siloxane, and $-X(CH_2)_n Y^1(CH_2) p_1 Y^2(CH_2)p_2 \ldots Y^i(CH_2)p_i CH_3$, where n ranges from 1 to 6, X and Y are independently selected from oxygen, sulfur, selenium, tellurium, and polonium, and $p_1$ through $p_i$ range from 1 to 6; or

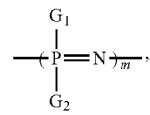

wherein $G_1$ and $G_2$ are pendant groups having different polarities and m is an integer greater than or equal to 100.

* * * * *

UNITED STATES PATENT AND TRADEMARK OFFICE
CERTIFICATE OF CORRECTION

Page 1 of 1

PATENT NO. : 8,124,414 B2
APPLICATION NO. : 12/613343
DATED : February 28, 2012
INVENTOR(S) : Mason K. Harrup, Frederick F. Stewart and Mark L. Stone It is certified that error appears in the above-identified patent and that said Letters Patent is hereby corrected as shown below:

In the claims:
CLAIM 19, COLUMN 30, LINE 2, change "$Y^1(CH_2)p_1 \quad Y^2(CH_2)p_2$" to --$Y^1(CH_2)p_1Y^2(CH_2)p_2$--

Signed and Sealed this
First Day of March, 2016

Michelle K. Lee
*Director of the United States Patent and Trademark Office*